(12) United States Patent
Biros et al.

(10) Patent No.: US 7,365,953 B2
(45) Date of Patent: Apr. 29, 2008

(54) APPARATUS AND METHOD FOR EMULATING A COMPONENT IN A CIRCUIT

(75) Inventors: Roger Biros, San Jose, CA (US); Yeshoda Yedevelly, Sunnyvale, CA (US); Patrice Griffon, Sunnyvale, CA (US)

(73) Assignee: Integration Associates Inc., Mtn. View, CA (US)

( * ) Notice: Subject to any disclaimer, the term of this patent is extended or adjusted under 35 U.S.C. 154(b) by 105 days.

(21) Appl. No.: 11/477,890

(22) Filed: Jun. 29, 2006

(65) Prior Publication Data
US 2007/0024380 A1   Feb. 1, 2007

Related U.S. Application Data

(60) Provisional application No. 60/696,138, filed on Jul. 1, 2005.

(51) Int. Cl.
*H02H 3/08* (2006.01)
(52) U.S. Cl. .................. 361/93.1; 361/93.2
(58) Field of Classification Search .......... 361/1, 361/93.1, 93.2, 93.8, 103; 363/50
See application file for complete search history.

(56) References Cited

U.S. PATENT DOCUMENTS 6,452,767 B1 * 9/2002 Brooks ................ 361/42

* cited by examiner

*Primary Examiner*—David Mis
(74) *Attorney, Agent, or Firm*—Francissen Patent Law, P.C.

(57) ABSTRACT

A circuit and method for emulating a component in a circuit are shown that control a current controlled oscillator with a first current that is proportional to a square of a load current of the component and also charge and discharge a high precision capacitor using the current controlled oscillator. The oscillations of the current controlled oscillator are counted to obtain a count value, which is transformed to a transformed current signal using a predetermined transfer function. The transformed current signal is subtracted from the first current that controls the current controlled oscillator. The transformed current signal is subtracted from a second current that is proportional to a square of the load current to determine whether the count value is incremented or decremented responsive to the oscillations of the current controlled oscillator.

19 Claims, 2 Drawing Sheets

APPARATUS AND METHOD FOR EMULATING A COMPONENT IN A CIRCUIT

CROSS REFERENCE TO RELATED APPLICATIONS

This application claims the benefit of U.S. Provisional Patent Application No. 60/696,138 filed Jul. 1, 2005, herein incorporated by reference in its entirety for all purposes.

FIELD OF INVENTION

The present invention relates to emulation of a component of a circuit. More particularly, it relates to hardware emulation of a transfer function for a circuit component.

BACKGROUND OF THE INVENTION

Emulation circuits exist for emulating the characteristics of a component, such as a wire designed to carry high current loads. For example, an emulation circuit may be used to emulate the heating of a wire under a current load in order to generate a trip signal. The emulation circuit is often used to monitor the thermodynamics of a wire under a variable current load in order to identify abnormal conditions. A typical approach to modeling the thermal dynamics of a component, e.g. wire heating due to current, is to use a resistor capacitor (RC) time constant.

FIG. 1 is a circuit diagram illustrating one example of an emulation circuit that emulates the effect of a load current $I_{LOAD}$ on a wire connected to node X. This emulation circuit, typically referred to as an I²T timer, uses an RC time constant to set a threshold for an overload trip signal. In this example, resistor R and capacitor C are coupled to node X. $I_{LOAD}$ charges capacitor C and resistor R discharges capacitor C to obtain the RC time constant response characteristic. Comparator COMP compares the voltage level generated at node X to a reference voltage in order to generate a trip signal TRIP if the voltage level exceeds the threshold determined by reference voltage $V_{REF}$.

The current $I_{LOAD}$ is a sample of the actual load current applied to the component to be emulated. For example, $I_{LOAD}$ may be a fractional representative sample of the actual load current that is squared, e.g. K*I², and applied to the RC combination. The voltage at the RC combination is, therefore, representative of the power in the load. The transfer function for the thermal dissipation of the load is emulated through the selection of the RC time constant. For example, a thermal time constant of five seconds may be emulated using a RC combination of a 1 microfarad capacitor and a 5 mega-ohm resistor, which are generally large high-precision components.

Though large high-precision resistors are available, their effective resistance is often distorted by factors as humidity, induction or printed circuit board (PCB) surface leakage. Further, the electro-static discharge (ESD) diodes typically provided for the protection of integrated circuits (ICs) effect the resistive accuracy due to diode leakage at high temperatures. Also, large value precision capacitors are not readily available and those that are available are typically physically large. In addition, some types of high value capacitors, such as tantalum or electrolytic capacitors, have high levels of leakage, which also degrades the accuracy of an associated RC time constant. All of these factors are exacerbated for system components that may be required to operate in extreme environmental conditions, e.g. −55 to +125° C. temperature range, as well as widely varying humidity levels.

SUMMARY OF THE INVENTION

In an embodiment of a circuit for emulating a component in a circuit, the circuit includes a first current mirror circuit that has an input for receiving a load current and first and second outputs. The current mirror circuit is configured to generate first and second current signals at the first and second outputs, respectively, responsive to the load current, where the first and second current signals are proportional to a square of the load current. A first comparator has a first input coupled to the first output of the current mirror circuit, a second input for receiving a first reference voltage, and an output for generating an up/down signal responsive a voltage at the first input compared to the reference voltage. A counter has an up/down control input coupled to the output of the first comparator, a clock input, and an output for outputting a count value of the counter. A transfer function circuit has an input for receiving the count value of the counter and an output for generating a third current signal. The transfer function circuit is configured to generate the third current signal responsive to the count value modified by a predetermined transfer function. An absolute value circuit has an input and an output, where the input of the absolute value circuit is electrically coupled to the first output of the first current mirror circuit. A current controlled oscillator circuit has a first input coupled to the output of the absolute value circuit, a second input coupled to an external interface terminal for electrical connection to a capacitor, and an output coupled to the clock input of the clock circuit. The oscillator is configured to generate a clock signal at its output that has a frequency that is determined by the capacitor coupled to the second input of the oscillator and a current present at the first input of the oscillator. A second current mirror circuit has an input coupled to the output of the transfer function circuit, a first output coupled to the input of the absolute value circuit, and a second output coupled to the first input of the first comparator. The second current mirror circuit is configured to generate fourth and fifth current signals that are proportional to the third current signal at the first and second outputs, respectively.

An embodiment of a method for emulating a component in a circuit calls for controlling a current controlled oscillator with a first current that is proportional to a square of a load current of the component as well as charging and discharging a high precision capacitor using the current controlled oscillator. The method also involves counting the oscillations of the current controlled oscillator to obtain a count value and transforming the count value to a transformed current signal using a predetermined transfer function. The method further sets forth subtracting the transformed current signal from the first current that controls the current controlled oscillator. Still further, the method recites subtracting the transformed current signal from a second current that is proportional to a square of the load current to determine whether the count value is incremented or decremented responsive to the oscillations of the current controlled oscillator.

BRIEF DESCRIPTION OF THE DRAWINGS

Certain embodiments of the invention are described with reference to the following figures, wherein.

DETAILED DESCRIPTION OF THE EMBODIMENTS

In an emulator in accordance with the present invention, a long time constant is obtained by utilizing a current controlled oscillator that is controlled by a current that is proportional to the square of the load current in a component being emulated. The current controlled oscillator includes a small high precision capacitor that is charged and discharged by the oscillations thereby multiplying the value of the capacitor for purposes of emulating a large time constant. A digital timer circuit is used to simulate a large time constant using the small high precision capacitor and small current levels.

Figure 1:
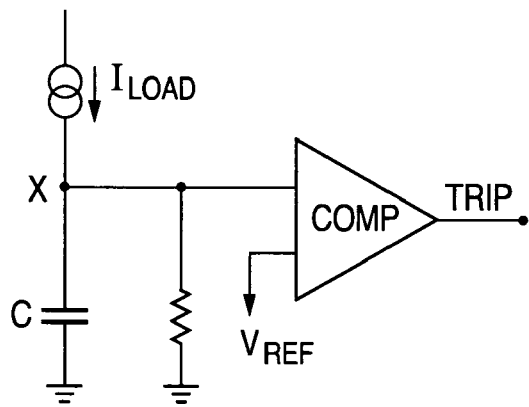
FIG. 1 is a circuit diagram that illustrates an example of a conventional emulation circuit.
Figure 2:
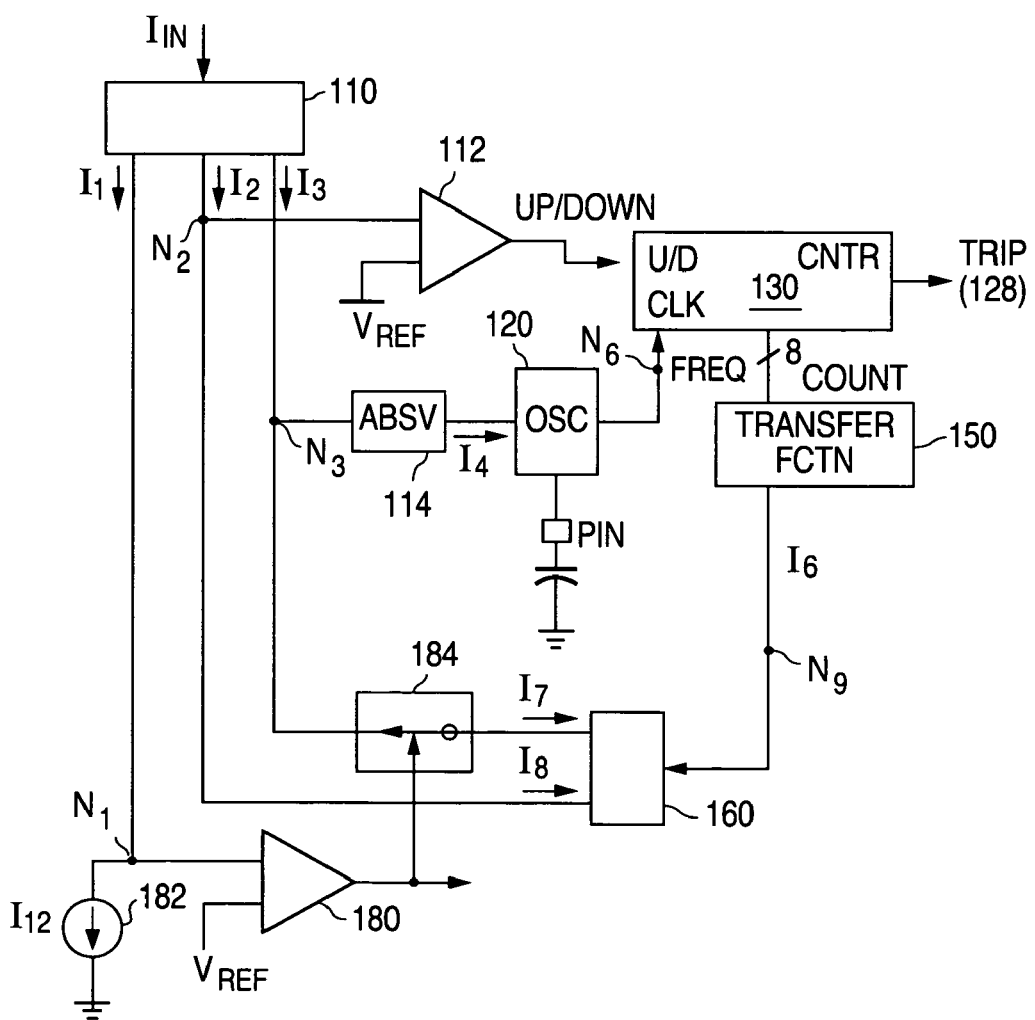
FIG. 2 is a functional block diagram illustrating an embodiment of an emulation circuit.

FIG. 2 is a functional block diagram illustrating one exemplary embodiment of an emulator circuit according to the present invention. A load current $I_{IN}$ is input to a current mirror 110 that generates three corresponding currents $I_1$, $I_2$ and $I_3$ that are preferably proportional to the square of the input load current $I_{IN}$, e.g. $I_1 = K*I_{IN}^2$. Current $I_1$ enters node $N_1$, current $I_2$ enters node $N_2$, and current $I_3$ enters node $N_3$. $I_2$ is input to comparator 112, which compares the voltage at node $N_2$ to a reference voltage $V_{REF}$ and outputs to circuit node $N_4$ an UP/DOWN signal that controls the direction of counting in counter 130, where a low logic voltage level at the output of comparator 112 corresponds to a downward count direction.

Currents $I_3$ and $I_7$ are subtracted at the input to an absolute value circuit 114, which outputs a current $I_4$ that reflects the absolute magnitude of the difference between currents $I_3$ and $I_7$. Current $I_4$ drives current controlled oscillator 120, which is coupled to external high precision capacitor CAP through interface terminal PIN. Oscillator 120 outputs a frequency signal FREQ at node $N_6$ that is proportional to current $I_4$ and to the value of the high precision capacitor CAP, which is charged and discharged by the oscillator. FREQ, in turn, drives a clock input CLK of counter 130.

Counter 130 generates a count value that increments or decrements responsive to the clock frequency FREQ received from oscillator 120 under control of the UP/DOWN signal produced by comparator 112. In this example, counter 130 is an eight bit counter that produces a trip signal TRIP when it reaches a value of 128 and outputs an eight bit COUNT signal to transfer function circuit 150. Transfer function circuit 150 implements a transfer function, such as f(x) or f(e$^x$), that is applied to the COUNT value in order to produce a current I6. The transfer function implemented by transfer function circuit 150 shapes the response of the circuit. In one example, the function implemented is f(e$^x$) and the circuit implements an exponential response to the input current load. Other examples of possible transfer functions or models include a linear transfer function or a squared function.

Transfer function circuit 150 outputs a current $I_6$ at node $N_9$, which is input to current mirror 160. Current mirror 160 produces two currents $I_7$ and $I_8$ that are proportional to the current $I_6$. $I_7$ feeds back to node $N_3$ and the input to absolute value circuit 114. Current $I_7$ is subtracted from current $I_3$ at node $N_3$ such that the current driving oscillator 120 steadily decreases, in a steady state, as the value of the counter increases and decreases the rate at which the counter changes. The oscillation frequency slows and eventually stops when $I_3 = I_7$. This results in the count value of counter 130 tracking the magnitude of the input current $I_{IN}$. If the input current changes, then $I_3 \neq I_7$ and oscillation resumes. In one embodiment shown in FIG. 3, DAC 240 generates a reference current at node $N_7$ that is related to the maximum load current in a manner proportional to the maximum count of counter 130, e.g. Iref=Imax*1/128.

Similarly, current $I_8$ output by current mirror 160 feeds back to node $N_2$ and the input to comparator 112, where it is subtracted from current $I_2$. The result of the subtraction of $I_8$ from $I_2$ determines the direction of count for counter 130. When $I_2 > I_8$, then the output of comparator 112 causes counter 130 to count up. When $I_8 = I_2$, e.g. the count value reflects the magnitude of the input current, then the output of comparator 112 goes low, which causes counter 130 to count down. At steady state, the count may tend to increment above and decrement below an average count value. When the load current $I_{IN}$ increases, then $I_2 > I_8$, the output of comparator 112 goes high, $I_3 > I_7$, oscillator 120 begins to oscillate, and the result is that the counter increments the count value until $I_3 = I_8$. Similarly, if the load current drops, then $I_2 < I_8$, the output of comparator 112 goes low, $I_3 < I_7$, the oscillator begins to oscillate, and counter 130 decrements until the count value until $I_3 = I_8$.

The example of FIG. 2 also includes overload detection circuitry that detects a current overload and, responsive thereto, causes the TRIP signal to be activated. Comparator 180 receives current $I_1$ from current mirror 110. Current source 182 generates a reference current I12, which is subtracted from current $I_1$ at node $N_1$ and is the overload threshold. The output of comparator 180 controls switch 184, which is interposed current mirror 160 and node $N_3$ and can cut off current $I_7$.

When current $I_1$ exceeds reference current I12, which represents an overload condition, then the voltage at node $N_1$ rises and exceeds reference voltage $V_{REF}$ causing the output of comparator 180 to go active thereby opening switch 184. With switch 184 open, current $I_7$ is cut-off from node $N_3$ and is no longer subtracted from $I_3$. This results in the output of comparator 112 being forced high, oscillator 120 to oscillate rapidly, and the count value of counter 130 to quickly increment to the trip value, which activates the TRIP signal. In this way, the TRIP signal may be used to rapidly trip a circuit breaker to protect the emulated circuit from the overload current. Further, the output OLST of comparator 180 may be used as an overload detection signal for data collection and alarm signaling purposes, for example.

Note that counter 130 tracks the cumulative integration of the current waveform, where the count reflects the total waveform width of various overload currents, e.g. spikes, and other changes in the input current $I_{IN}$. However, when comparator 180 detects an overload condition, the overload count proceeds from the current count value. Consequently, if a current overload is of short duration and/or the pre-overload current level was relatively low, then the TRIP value may not be reached and no TRIP signal is generated. For example, this scenario may apply where a low load current has persisted for a substantial period of time, which results in a low count value in counter 130, followed by a short duration overload that does not drive the count high enough to reach the TRIP value. In such a situation, the cumulative load on the emulated circuit, e.g. a wire, is not so great as to merit tripping a circuit breaker.

Figure 3:
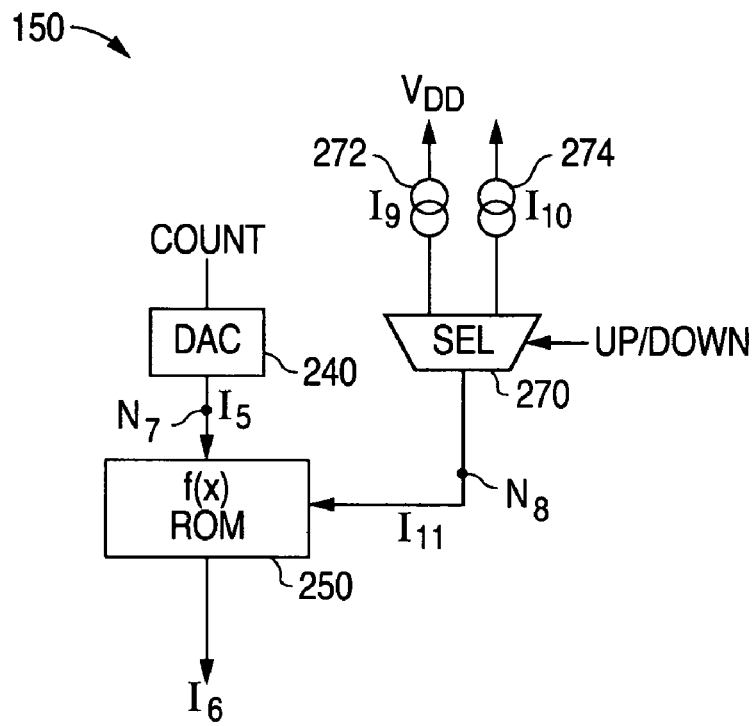
FIG. 3 is a functional block diagram illustrating one exemplary embodiment of the transfer function circuit of FIG. 2.

FIG. 3 is a functional block diagram illustrating one exemplary embodiment of the transfer function circuit 150 of FIG. 2. DAC 240 generates an analog current $I_5$ at node $N_7$ that corresponds to the digital count value that it receives from counter 130. $I_5$ is input to function generator 250, which is an analog circuit that implements an exponential transfer function, in this example, of $f(e^x)$. For example, function generator 250 may be a translinear implementation circuit that is well known in the art.

Note that a status register may be interposed, for example, between the counter 130 and DAC 240 in order to capture the counter value for use in reporting current levels. For example, the status register may be software readable in an overall system, such that the count value in the status register is read and displayed or stored. See the discussion regarding FIG. 4 below.

Optionally, the output of comparator 112 also controls multiplexor (MUX) 270, which selects between two reference currents $I_9$ and $I_{10}$ provided by current sources 272 and 274 respectively. This option permits for different transfer functions to be implemented for rising and falling currents. In the example of FIG. 3, this is implemented by inputting two different gain control currents $I_9$ and $I_{10}$, supplied by current generators 272 and 274 respectively, into multiplexor 270 and using the up/down control signal generated by comparator 112 to control the MUX 270. Thus, in this example, when the load current $I_{IN}$ is increasing, MUX 270 passes current $I_9$ to node $N_8$ as the gain control current $I_{11}$ to function generator 250. When load current $I_{IN}$ is decreasing, then MUX 270 passes current $I_{10}$ to function generator 250. In this manner, for example, a circuit that heats up at a faster rate than it cools down may be emulated. Note that his feature permits the speed of the response to be adjusted without changing the capacitor in the circuit. Note that, in this example, gross control of the transfer function may be obtained by selection of the value of capacitor CAP, while fine control of the transfer function may be obtained through adjustments to the current $I_{11}$.

Figure 4:
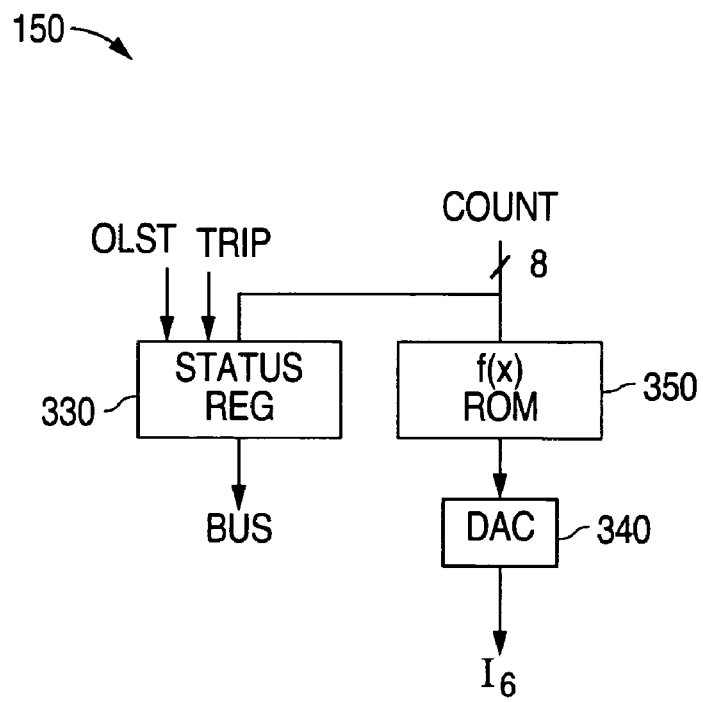
FIG. 4 is a functional block diagram illustrating another exemplary embodiment of the transfer function circuit of FIG. 2.

FIG. 4 is a functional block diagram illustrating another exemplary embodiment of the transfer function circuit 150 of FIG. 2. In this example, the transfer control function is performed digitally through the use of read only memory (ROM) 350, which is coupled to DAC 340. ROM 350 receives the COUNT value from counter 130 of FIG. 2 and implements a transfer function, e.g. f(x) in this example, through a look-up table. Also, in this example, an optional software readable status register 330 is coupled to counter 130 of FIG. 2.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An emulator circuit for emulating a circuit component, the emulator circuit comprising:
    a first current mirror circuit having an input for receiving a load current and first and second outputs, where the current mirror circuit is configured to generate first and second current signals at the first and second outputs, respectively, responsive to the load current, where the first and second current signals are proportional to a square of the load current;
    a first comparator having a first input coupled to the first output of the current mirror circuit, a second input for receiving a first reference voltage, and an output for generating an up/down signal responsive a voltage at the first input compared to the reference voltage;
    a counter having an up/down control input coupled to the output of the first comparator, a clock input, and an output for outputting a count value of the counter;
    a transfer function circuit having an input for receiving the count value of the counter and an output for generating a third current signal, where the transfer function circuit is configured to generate the third current signal responsive to the count value modified by a predetermined transfer function;
    an absolute value circuit having an input and an output, where the input of the absolute value circuit is electrically coupled to the first output of the first current mirror circuit;
    a current controlled oscillator circuit having a first input coupled to the output of the absolute value circuit, a second input coupled to an external interface terminal for electrical connection to a capacitor, and an output coupled to the clock input of the clock circuit, where the oscillator is configured to generate a clock signal at its output that has a frequency that is determined by the capacitor coupled to the second input of the oscillator and a current present at the first input of the oscillator; and
    a second current mirror circuit having an input coupled to the output of the transfer function circuit, a first output coupled to the input of the absolute value circuit, and a second output coupled to the first input of the first comparator, where the second current mirror circuit is configured to generate fourth and fifth current signals that are proportional to the third current signal at the first and second outputs, respectively.

2. The emulator circuit of claim 1, the emulator circuit further including:
    a switch circuit interposed the second current mirror circuit and the absolute value circuit and having a first current terminal coupled to the first output of the second current mirror circuit and a second current terminal coupled to the input terminal of the absolute value circuit, and a control terminal, where the switch circuit is configured to switch current flow between the first current terminal and the second current terminal in response to a signal received at the control terminal;
    a second comparator having a first input coupled to the second output of the first current mirror circuit, a second input for receiving a second reference voltage, and an output coupled to the control terminal of the switch circuit;

a first current source for sourcing a first predetermined reference current from a first terminal of the first current source to a second terminal of the current source, where the first terminal of the first current source is coupled to the first input of the second comparator; and wherein the first current mirror circuit further includes a third output for generating a sixth current signal that is proportional to the square of the load current and the third output of the first current mirror circuit is coupled to the first input of the second comparator.

3. The emulator circuit of claim 1, where the transfer function circuit further comprises:

a digital to analog converter (DAC) having an input coupled to the output of the counter and an output for generating a seventh current signal that is proportional to the count value; and an analog transfer function generator having a first input coupled to the output of the DAC, where the analog transfer function generator is configured to apply the predetermined transfer function to the seventh current signal in order to generate the third current signal at an output of the function generator.

4. The emulator circuit of claim 3, where the transfer function circuit further includes:

a second current source circuit for sourcing a second predetermined reference current from a first terminal of the second current source to a second terminal of the second current source;

a third current source circuit for sourcing a third predetermined reference current from a first terminal of the third current source to a second terminal of the third current source;

a multiplexor having a first input coupled to the second terminal of the second current source circuit, a second input coupled to the second terminal of the third current source circuit, a control input coupled to the output of the first comparator; and where the analog transfer function generator has a second input coupled to the output of the multiplexor, where the analog transfer function generator is configured to use a current received from the multiplexor to control a gain of the analog transfer function generator.

5. The emulator circuit of claim 1, where the transfer function circuit further comprises:

a digital transfer function generator having a first input coupled to the output of the counter, where the digital transfer function generator is configured to apply the predetermined transfer function to the count value in order to produce a transformed count value at an output of the digital transfer function generator;

a digital to analog converter (DAC) having an input coupled to the output of the digital transfer function generator and an output for generating the third current signal that is proportional to the transformed count value.

6. The emulator circuit of claim 1, where the emulator circuit further comprises a software readable status register having an input coupled to the output of the counter, where the status register is configured to store the count value from the counter and the count value stored in the register is accessible by a processor.

7. The emulator circuit of claim 6, wherein:

the counter further includes an output configured to generate a trip signal when the counter reaches a predetermined count value; and the status register is further configured to store the trip signal value and make the stored trip signal value software readable.

8. The emulator circuit of claim 2, wherein the emulator circuit further comprises a software readable status register having an input coupled to the output of the counter, where the status register is configured to store the count value from the counter to store an output signal of the second comparator and the count value and the output signal stored in the register are accessible by a processor.

9. A method for emulating a circuit component, the method comprising the steps of:

controlling a current controlled oscillator with a first current that is proportional to a square of a load current of the component;

charging and discharging a high precision capacitor using the current controlled oscillator;

counting the oscillations of the current controlled oscillator to obtain a count value;

transforming the count value to a transformed current signal using a predetermined transfer function;

subtracting the transformed current signal from the first current that controls the current controlled oscillator; and subtracting the transformed current signal from a second current that is proportional to a square of a load current to determine whether the count value is incremented or decremented responsive to the oscillations of the current controlled oscillator.

10. The method of claim 9, the method further comprising the steps of:

monitoring a difference between a predetermined reference current and a third current that is proportional to a square of the load current; and isolating the transformed current signal from the first current that controls the current controlled oscillator when the third current exceeds the predetermined reference current in order to generate a trip signal.

11. The method of claim 10, the method further comprising the step of storing at least one of the count value, the trip signal, and the difference between the predetermined reference current and the load current for access by a processor.

12. The method of claim 9, the method further comprising the step of storing the count value for access by a processor.

13. The method of claim 9, wherein the step of transforming the count value to a transformed current signal using a predetermined transfer function comprises:

converting the count value to a proportional current signal; and transforming the proportional current signal to the transformed current signal using the predetermined transfer function.

14. The method of claim 13, where the step of transforming the proportional current signal to the transformed current signal using the predetermined transfer function further includes selecting a gain of the predetermined transfer function based on whether the count value is incremented or decremented responsive to the oscillations of the current controlled oscillator.

15. The method of claim 9, wherein the step of transforming the count value to a transformed current signal using a predetermined transfer function comprises:

transforming the count value to a transformed count value using the predetermined transfer function; and converting the transformed count value to a transformed current signal.

16. An apparatus for emulating a component in a circuit, the apparatus comprising:

oscillator means for charging and discharging a high precision capacitor;

means for controlling a frequency of the oscillator means using a first current that is proportional to a square of a load current of the component;

counting the oscillations of the oscillator means to obtain a count value;

means for transforming the count value to a transformed current signal using a predetermined transfer function;

means for subtracting the transformed current signal from the first current that controls the current controlled oscillator; and means for subtracting the transformed current signal from a second current that is proportional to a square of a load current to determine whether the count value is incremented or decremented responsive to the oscillations of the oscillator means.

17. The apparatus of claim 16, the apparatus further comprising:

means for monitoring a difference between a predetermined reference current and a third current that is proportional to a square of the load current; and means for isolating the transformed current signal from the first current that controls the current controlled oscillator when the third current exceeds the predetermined reference current in order to generate a trip signal.

18. The apparatus of claim 17, the apparatus further comprising means for storing at least one of the count value, the trip signal, and the difference between the predetermined reference current and the load current for access by a processor.

19. The apparatus of claim 16, the apparatus further comprising means for storing the count value for access by a processor.

* * * * *